United States Patent [19]

Beula et al.

[11] Patent Number: 5,082,571
[45] Date of Patent: Jan. 21, 1992

[54] CAUSTIC SULFIDE WET OXIDATION PROCESS

[75] Inventors: David A. Beula, Schofield; Joseph A. Momont, Mosinee; William M. Copa, Schofield, all of Wis.

[73] Assignee: Zimpro Passavant Environmental Systems Inc., Rothschild, Wis.

[21] Appl. No.: 698,868

[22] Filed: May 13, 1991

[51] Int. Cl.$^5$ .......................... C02F 1/72; C02F 11/08
[52] U.S. Cl. .................................... 210/739; 210/761; 210/928
[58] Field of Search ............... 210/739, 743, 761, 762, 210/908, 916, 928

[56] References Cited

U.S. PATENT DOCUMENTS

| | | | |
|---|---|---|---|
| 3,186,942 | 6/1965 | Benger | 210/63 |
| 3,761,409 | 9/1973 | McCoy et al. | 210/63 |
| 4,155,848 | 5/1979 | Sato et al. | 210/60 |
| 4,350,599 | 9/1982 | Chowdhury | 210/761 |
| 4,399,111 | 8/1983 | Baur et al. | 423/226 |
| 4,756,837 | 7/1988 | Nadezhdin | 210/761 |

OTHER PUBLICATIONS

McCoy, J. W.; "Chemical Analysis of Industrial Water", Chemical Publishing Co., New York, 1969, pp. 125-153.

"Manual on Disposal of Refinery Wastes, Volume on Liquid Wastes"; Chapter 11—Oxidation; American Petroleum Institute, 1969.

*Primary Examiner*—Thomas Wyse
*Attorney, Agent, or Firm*—Tipton L. Randall

[57] ABSTRACT

A process for treatment of caustic sulfide liquor by wet oxidation in a nickel-based alloy system is described. The liquor is first analyzed for alkalinity consuming species and for nonsulfidic alkalinity. If excess alkalinity consuming species is present compared to nonsulfidic alkalinity, then additional nonsulfidic alkalinity is added to the raw liquor such that excess alkalinity is present during wet oxidation treatment, thus preventing excessive corrosion to the nickel-base alloy system.

6 Claims, 1 Drawing Sheet

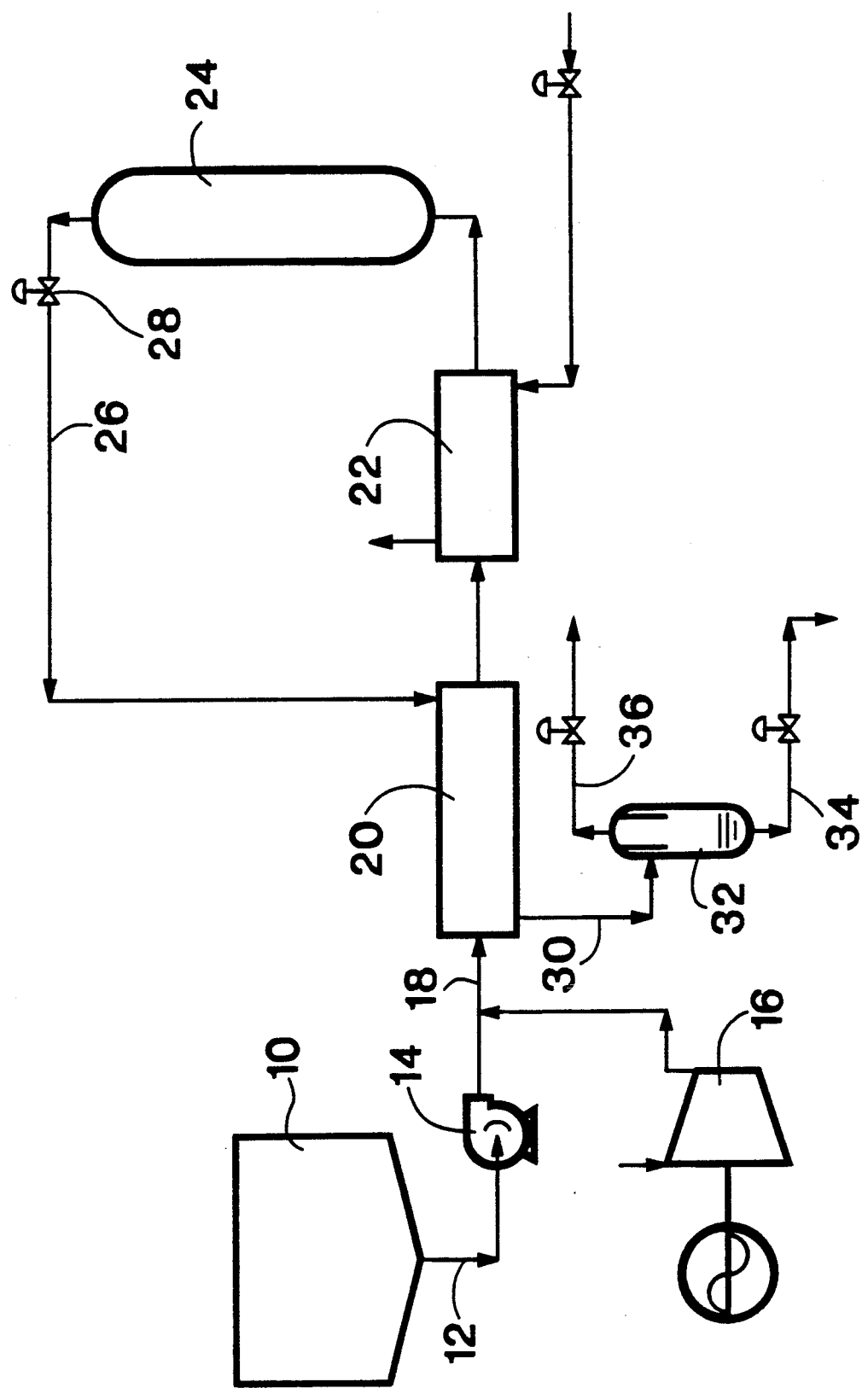

CAUSTIC SULFIDE WET OXIDATION PROCESS

FIELD OF THE INVENTION

This invention relates to a process for treatment of caustic sulfide liquor by wet oxidation, and more particularly to treatment of the liquor in a nickel-based alloy wet oxidation system.

DESCRIPTION OF RELATED ART

Caustic sulfide liquors are generated in a variety of processes from a number of industrial sources. These caustic liquors are commonly used to remove acidic components from various gas streams by scrubbing or from liquid streams by extraction. The gas streams are generated in the petrochemical industry, petroleum refining, pulp and paper manufacture and various chemical manufacturing processes. The acidic components include hydrogen sulfide, $H_2S$, mercaptans, RSH, and possibly organic acids. Analysis of caustic sulfide liquors for acidic components, as well as metal carbonates/bicarbonates and caustic soda, is described by J. W. McCoy in *Chemical Analysis of Industrial Water*, Chemical Publishing Co., New York, 1969. See particularly pages 125-153.

The contaminated caustic liquors represent a formidable disposal problem due to their caustic content as well as the captured acidic components therein. Neutralization of the caustic liquor by acid addition can result in release of the acidic components. Therefore it is essential to convert the captured acidic components to a form suitable for release to the environment. Further, there may be additional components present in the caustic liquor which add to the Chemical Oxygen Demand (COD) of the liquor. These components include various carbonaceous materials including phenolics, organic acids and oils.

Wet oxidation is the preferred method of treatment for caustic sulfide liquors since the products of oxidation are inorganic sulfate, carbon dioxide and water. Also, the oxidation is carried out within a closed system which prevents transfer of pollutants to the atmosphere. The highly alkaline nature of these caustic liquors requires special materials of construction for wet oxidation systems employed in their treatment. The nickel-based alloys, such as Inconel 600, are well suited to withstand the elevated temperatures and pressures employed in the wet oxidation process for caustic liquor treatment.

In U.S. Pat. No. 3,761,409 McCoy et al. disclose a continuous process for the air oxidation of sulfidic, ammoniacal sour water where feed water is adjusted to a pH between about 6 to 13 and the oxidation occurs at 250° F. to 520° F. at 75 to 800 psig with up to 500% excess oxygen based on the stoichiometric conversion of sulfide to sulfate.

Chowdhury in U.S. Pat. No. 4,350,599 discloses wet oxidation of caustic liquor where carbon dioxide generated by the oxidation is used to reduce the pH of the caustic feed liquor to below 11. Maintaining the feed below pH 11.0 but above 7.0 prevents corrosion of the less expensive stainless steel wet oxidation system.

As mentioned above, the nickel-based alloys are resistant to corrosion by caustic sulfide liquors under wet oxidation conditions, provided the pH of the liquor is maintained on the alkaline side, that is above pH 7. The wet oxidation of sulfide liquors generates acidic species which consume alkalinity. Depending on the components present, their concentration, and the pH of the caustic sulfide liquor, wet oxidation may produce an oxidized liquor in which the pH is acidic, i.e. all alkalinity is consumed, and which is highly corrosive to the nickel-based wet oxidation system. To overcome this difficulty, we have devised a process which relates the species present in the caustic liquor to the amount of caustic required to maintain an excess of alkalinity in the liquor during wet oxidation treatment. This process allows a nickel-based alloy wet oxidation system to safely treat caustic sulfide liquor without excessive corrosion to the materials of construction of the system. It must be recognized that the corrosion problems need careful consideration in that the integrity of the pressurized wet oxidation system is important for both safety and economic reasons.

SUMMARY OF THE INVENTION

The invention is a process for treatment of a caustic sulfide liquor by wet oxidation in a nickel-based alloy system which prevents excessive corrosion of the system. The process comprises the steps:
 a) analyzing the caustic sulfide liquor for initial concentrations of total alkalinity, total sulfides, mercaptans, COD, thiosulfate, total carbonate and pH to determine the amount of nonsulfidic alkalinity consumed by said liquor upon wet oxidation treatment;
 b) adding sufficient additional nonsulfidic alkalinity to said caustic sulfide liquor whereby the initial nonsulfidic alkalinity concentration plus additional nonsulfidic alkalinity concentration exceeds the nonsulfidic alkalinity consumed upon wet oxidation treatment as determined in step a; and
 c) carrying out said treatment process of wet oxidation upon said caustic sulfide liquor within said nickel-based alloy system to destroy sulfides and mercaptans and produce a treated liquor with excess nonsulfidic alkalinity concentration thereby preventing excessive corrosion to said nickel-based alloy wet oxidation system.

BRIEF DESCRIPTION OF THE DRAWING

The FIGURE shows a general schematic for a wet oxidation system used to treat caustic sulfide liquors.

DESCRIPTION OF THE PREFERRED EMBODIMENTS

The FIGURE shows a schematic flow diagram for a wet oxidation system used for treatment of caustic sulfide scrubbing liquors. Referring to the FIGURE, raw caustic sulfide liquor from a storage tank 10 flows through a conduit 12 to a high pressure pump 14 which pressurizes the liquor. The raw liquor is mixed with a pressurized oxygen-containing gas, supplied by a compressor 16, within a conduit 18, The mixture flows through a heat exchanger 20 where it is heated to a temperature which initiates oxidation. The heated mixture then flows through a second heat exchanger 22 which provides auxiliary heat for startup of the system. For waste with low COD content, auxiliary heating may need to be continuously applied through the second heat exchanger 22 in order to maintain the desired operating temperature for the wet oxidation system. The heated feed mixture then enters a reactor vessel 24 which provides a residence time wherein the bulk of the oxidation reaction occurs. The oxidized liquor and oxygen depleted gas mixture then exits the reactor through a conduit 26 controlled by a pressure control valve 28. The hot oxidized effluent traverses the heat exchanger 20 where it is cooled against incoming raw liquor and gas mixture. The cooled effluent mixture flows through a conduit 30 to a separator vessel 32 where liquid and gases are disengaged. The liquid effluent exits the separator vessel 32 through a lower conduit 34 while the gases are vented through an upper conduit 36.

It is imperative that an excess of alkalinity be maintained throughout the nickel-based alloy wet oxidation system when treating caustic sulfide liquor. To accomplish this goal, precise analyses of certain components of the raw caustic sulfide liquor must be made. Based upon these analyses, an appropriate amount of alkalinity is added to the raw caustic sulfide liquor to maintain an excess of alkalinity throughout the wet oxidation system. It is important to avoid addition of excess alkalinity since the oxidized liquor generally must be neutralized prior to discharge to the environment. Monitoring the alkalinity or pH of the oxidized effluent with the system in operation is not effective for corrosion control since by the time the pH of the effluent is found to be acidic from insufficient alkalinity, the corrosion damage to the oxidation system has already occurred. The pH range for the treated liquor should be between 8 and 14.

The specific analyses required for the raw liquor include pH, total alkalinity, total sulfides, mercaptide, thiosulfate, carbonate and Chemical Oxygen Demand (COD). Based on these results, the amount of nonsulfidic alkalinity consumed by the liquor upon wet oxidation treatment is calculated and compared to the nonsulfidic alkalinity available for neutralizing acid formed in raw liquor. Any deficiency in available nonsulfidic alkalinity is added to the raw caustic sulfide liquor prior to wet oxidation treatment to maintain an excess of alkalinity during treatment.

The total alkalinity of a caustic solution is the sum of all the titratable bases present. Total alkalinity is measured by determining the number of equivalents of strong acid required to neutralize a given volume of caustic solution to a pH of 4.5. For instance, titration of 100 milliliters of a caustic solution to a pH of 4.5 required 25 milliliters of 0.5 normal hydrochloric acid (0.5 equivalents/liter). The total alkalinity of the caustic solution is therefore 0.125 equivalents/liter. The total alkalinity of the liquor results not only from metal hydroxides (NaOH), carbonates ($Na_2CO_3$) and bicarbonates ($NaHCO_3$), herein termed nonsulfidic alkalinity, but also from metal sulfides (NaS) and bisulfides (NaHS), as well as metal mercaptides (NaSR), herein termed sulfidic alkalinity. The total alkalinity of the caustic solution can be increased by adding basic substances, such as alkali metal hydroxides, carbonates or bicarbonates, to the solution.

Analysis of the caustic solution for pH, total sulfides, mercaptides, thiosulfate, carbonate and COD is by well known analytical procedures. The procedures outlined by J. W. McCoy in *Chemical Analysis of Industrial Water*, pages 125-153, are particularly useful. The measurement of pH is by a glass electrode against a standard calomel electrode. Total sulfides and mercaptide concentrations are determined by potentiometric titration with standardized silver nitrate solution. Thiosulfate is analyzed by an iodine titration method. Carbonate may be measured either by barium carbonate precipitation followed by acidification and back-titration with standardized base or by a dissolved inorganic carbon procedure. COD is measured by the silver catalyzed dichromate oxidation method, Standard Methods No. 5220.

Considering the alkalinity requirement for each of the components, we can write the following oxidation equations:

Sulfidic Components $$Na_2S + 2O_2 \longrightarrow Na_2SO_4$$

$$NaHS + 2O_2 + NaOH \longrightarrow Na_2SO_4 + H_2O$$

$$Na_2S_2O_3 + 2O_2 + 2NaOH \longrightarrow 2Na_2SO_4 + H_2O$$

$$NaSR + 5/2O_2 + 2NaOH \longrightarrow Na_2SO_4 + NaOOR + H_2O$$

Organic Components $$NaOOR + O_2 + NaOH \longrightarrow NaOOR' + NaHCO_3$$

$$RH + O_2 + NaOH \longrightarrow NaOOR + H_2O$$

These equations summarize the alkalinity requirements for the various species present in caustic sulfide liquors. Sulfide, when present as sodium sulfide, does not consume any alkalinity when it is oxidized. Sulfide, when present as bisulfide, NaHS, consumes one equivalent of alkalinity for each mole of NaHS oxidized. Each mole of thiosulfate oxidized consumes two equivalents of alkalinity. Sulfur, when present as sodium mercaptide, NaSR, consumes two equivalents of alkalinity for each mole of NaSR-sulfur oxidized.

The organic portion of the Chemical Oxygen Demand (COD) consumes one equivalent of alkalinity for each mole of oxygen used in the oxidation of organic species. The organic portion of the COD is calculated by measuring the total COD of the caustic waste and subtracting the sulfidic COD which is calculated from the analytical concentrations determined for each sulfidic component. That is:

$$COD\ (total) - COD\ (sulfidic) = COD\ (organic)$$

The amount of COD (organic) which is removed will depend upon oxidation conditions and will vary from about 10 percent at 150° C. to about 80 percent at 280° C. Thus the alkalinity required will be some fraction of the total COD (organic), depending on operating temperature.

$$COD\ (organic) \times (10\%\ to\ 80\%) = COD\ (organic\ removed)$$

In calculating the amount of alkalinity consumed by the liquor upon wet oxidation treatment, determining the concentrations of sulfide, $\{S=\}$, and bisulfide, $\{HS-\}$, is important since sulfide consumes no alkalinity upon oxidation while bisulfide consumes one equivalent of alkalinity per mole oxidized. Likewise, an accurate determination of solution pH is important since pH affects the dissociation of hydrogen sulfide, sodium bisulfide and sodium sulfide.

As mentioned above, the pH of the caustic liquor is determined with a pH meter fitted with a special glass electrode for measurement of pH in the range 11 to 14 against a saturated calomel electrode. The observed pH must be corrected for the sodium ion concentration in the liquor by using a nomograph chart supplied with the glass electrode.

The total sulfides concentration $C_s$ of the liquor is determined by potentiometric titration with standard silver nitrate solution. This total sulfides concentration plus the accurately determined pH value allows calculation of the sulfide concentration, $\{S^=\}$, and bisulfide concentration, $\{HS^-\}$, as follows:

The dissociation constants for hydrogen sulfide (H₂S) are: $K_1 = 5.7 \times 10^{-8}$ and $K_2 = 1.2 \times 10^{-15}$ and $\{H^+\} = 10^{-pH}$.

According to acid-base equilibrium principles, it follows that:

$$\{HS^-\} = C_s[K_1\{H^+\}/\{H^+\}^2 + K_1\{H^+\} + K_1K_2]$$

$$\{S^=\} = C_s[K_1K_2/\{H^+\}^2 + K_1\{H^+\} + K_1K_2]$$

Using these equations the ratio of concentrations of bisulfide to sulfide can be calculated over the pH range 9 to 14. This ratio, from the above two equations, simplifies to $\{HS^-\}/\{S^=\} = K_1\{H^+\}/K_1K_2$ which gives the following:

| pH | $\{H^+\}$ | $\{HS^-\}/\{S^=\}$ |
|---|---|---|
| 9 | $1 \times 10^{-9}$ | 833,333. |
| 10 | $1 \times 10^{-10}$ | 83,333. |
| 11 | $1 \times 10^{-11}$ | 8,333. |
| 12 | $1 \times 10^{-12}$ | 833. |
| 13 | $1 \times 10^{-13}$ | 83.3 |
| 13.5 | $3.16 \times 10^{-14}$ | 26.4 |
| 14 | $1 \times 10^{-14}$ | 8.33 |

With the total sulfides concentration $C_s$ determined and the bisulfide to sulfide ratio determined from the pH of the liquor, the individual sulfide species concentrations are easily determined algebraically.

From these calculations it can be seen that even at pH 14 the vast majority of sulfide is present as bisulfide, HS⁻, which consumes one equivalent of alkalinity upon oxidation.

Nonsulfidic Alkalinity Components

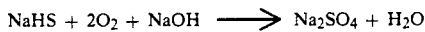

The amount of nonsulfidic alkalinity present in the liquor and available for consumption by the sulfidic species also requires determination. The reactions shown above for nonsulfidic alkalinity components show that each mole of sodium hydroxide and sodium bicarbonate provides one equivalent of alkalinity while each mole of sodium carbonate provides two equivalents of alkalinity. The pH of the liquor also affects the proportion of carbonate to bicarbonate present in the liquor.

As mentioned above, the total carbonate concentration of the liquor may be measured by the barium carbonate precipitation procedure or by a dissolved inorganic carbon procedure. The chosen analysis provides a total carbonate concentration, $C_{carbonate}$. This value plus the accurately determined pH value, determined as described earlier, allows calculation of the carbonate concentration, $\{CO_3^=\}$, and bicarbonate concentration, $\{HCO_3^-\}$, as follows: The dissociation constants for carbonic acid (H₂CO₃) are:
$K_1 = 4.3 \times 10^{-7}$ and $K_2 = 5.6 \times 10^{-11}$ and $\{+\} = 10^{-pH}$.

According to acid-base equilibrium principles, it follows that:

$$\{HCO_3^-\} = C_{carbonate}[K_1\{H^+\}/\{H^+\}^2 + K_1\{H^+\} + K_1K_2]$$

$$\{CO_3^=\} = C_{carbonate}[K_1K_2/\{H^+\}^2 + K_1\{H^+\} + K_1K_2]$$

Using these equations the ratio of concentrations of bicarbonate to carbonate can be calculated over the pH range 8 to 14. This ratio, from the above two equations, simplifies to $\{HCO_3^-\}/\{CO_3^=\} = K_1\{H^+\}/K_1K_2$ which gives the following:

| pH | $\{H^+\}$ | $\{HCO_3^-\}/\{CO_3^=\}$ |
|---|---|---|
| 8 | $1 \times 10^{-8}$ | 205.7 |
| 9 | $1 \times 10^{-9}$ | 20.6 |
| 10 | $1 \times 10^{-10}$ | 2.06 |
| 11 | $1 \times 10^{-11}$ | 0.206 |
| 12 | $1 \times 10^{-12}$ | 0.0206 |
| 13 | $1 \times 10^{-13}$ | 0.00206 |
| 14 | $1 \times 10^{-14}$ | 0.000206 |

With the total carbonate concentration $C_{carbonate}$ determined and the bicarbonate to carbonate ratio determined from the pH of the liquor, the individual carbonate species concentrations are easily determined algebraically.

This leaves the concentration of sodium hydroxide to be determined. An extensive examination of the interaction of pH, hydroxide, sulfide, mercaptan and carbonate is set forth in the J. W. McCoy reference at pages 138-153. The hydroxide concentration for various conditions is obtained from the accurate pH measurement and previously determined species. These conditions are:

Condition I. pH > 13.0
$\{NaOH\}$ = T. Alkalinity − [($\{C_s\}$ + $\{RSNa\}$ + $\{CO_3^=\}$)) − $\{HS^-\}$]
Condition II. pH 12.0-13.0
$\{NaOH\} = \{OH^-\} = 10^{-(14-pH)}$
Condition III. pH < 12.0
$\{NaOH\} = 0$ Finally, totaling up the nonsulfidic alkalinity of the liquor from carbonate, bicarbonate and sodium hydroxide and comparing this total with the alkalinity requirements for sulfide, bisulfide, thiosulfate, mercaptan sulfur and organic COD determines if sufficient alkalinity is present to maintain the liquor in the proper operating pH range to prevent excessive corrosion to the wet oxidation system. If there is insufficient nonsulfidic alkalinity to satisfy the requirements of the alkalinity consuming species, then additional alkalinity must be added to the liquor to prevent corrosion of the wet oxidation system.

EXAMPLE

A caustic sulfide scrubbing liquor with a COD of 13.5 g/l and pH 12.78 was treated in a laboratory autoclave with excess oxygen by wet oxidation at 200° C. for 60 minutes. The oxidized liquor had a COD of 0.9 g/l and pH 1.5. This pH would cause excessive corrosion of a nickel based alloy wet oxidation system.

Further analyses of the raw liquor for components of interest gave the following results:

| pH | 12.78 |
|---|---|
| COD | 13.5 g/l |
| T. Alkalinity | 0.46 eq./l |
| T. Sulfides | 6.8 g/l |
| Thiosulfate | N.D. |
| Mercaptan Sulfur | N.D. |
| T. Carbonate | 2.3 g/l |

The oxygen demand for 6.8 g/l total sulfides is calculated to be 13.6 g/l, thus essentially all the 13.5 g/l of measured COD is from sulfides. No mercaptan sulfur or thiosulfate was detected. At pH 12.78 the ratio $\{HS^-\}/\{S^=\}=138.3$. Thus, essentially all sulfur is in the bisulfide form which on oxidation consumes one equivalent alkalinity per mole. The 6.8 g/l sulfide calculates to 7.013 g/l bisulfide which is 0.2125 eq./l.

The total carbonate concentration was 2.3 g/l as sodium carbonate. At pH 12.78, the ratio $\{HCO_3^-\}/\{CO_3^=\}=0.0034$. Thus, essentially all inorganic carbon is present in the carbonate form. The 2.3 g/l sodium carbonate provides 0.0434 eq./l alkalinity.

Since the liquor has pH 12.78, Condition II occurs and $\{NaOH\}=\{OH^-\}$ which is $10^{-(14-12.78)}=10^{-1.22}$ or 0.0603 moles/l. Thus $\{NaOH\}=0.0603$ eq./l. The available nonsulfidic alkalinity is the sum of carbonate and hydroxide which totals 0.1037 eq./l, about half of the 0.2125 eq./l alkalinity consuming bisulfide. At least 0.1125 eq./l alkalinity must be added to this liquor to prevent excessive corrosion and allow safe operation of a nickel-based alloy wet oxidation system.

Another caustic sulfide scrubbing liquor was analyzed for components of interest with the following results:

| pH | 13.79 |
|---|---|
| COD | 73.6 g/l |
| T. Alkalinity | 2.28 eq./l |
| T. Sulfides | 47.7 g/l |
| Thiosulfate | N.D. |
| Mercaptan Sulfur | N.D. |
| T. Carbonate | 6.63 g/l |

The oxygen demand for 47.7 g/l total sulfides is calculated to be about 95 g/l, thus all the measured COD is from sulfides. No mercaptan sulfur or thiosulfate was detected. At pH 13.79 the ratio $\{HS^-\}/\{S^=\}=13.52$ which results in a distribution of 93% bisulfide and 7% sulfide. The 47.7 g/l total sulfides is divided into 44.36 g/l bisulfide and 3.34 g/l sulfide. The 44.36 g/l bisulfide consumes 1.386 eq./l alkalinity upon oxidation.

At pH 13.79 the ratio $\{HCO_3^-\}/\{CO_3^=\}=0.0003$ so essentially all inorganic carbon is in the carbonate form which is 0.125 eq./l. At this pH the sodium hydroxide concentration is calculated as for Condition I:

$$\{NaOH\} = T. \text{Alkalinity} - [(\{C_s\} + \{RSNa\} + \{CO_3^=\}) - \{HS^-\}]$$

$$\{NaOH\} = 2.28 \text{ eq./l} - [(1.49 + 0 + 0.125) - 1.386] \text{ eq./l}$$

$$\{NaOH\} = 2.28 - 0.229 = 2.051 \text{ eq./l}$$

Thus the available nonsulfidic alkalinity is 2.175 eq./l while the bisulfide consumes only 1.386 eq./l alkalinity on oxidation. To verify these results wet oxidation of this raw liquor at 200° C. for 60 minutes in a laboratory autoclave resulted in an oxidized liquor with a COD of 1.7 g/l and pH 9.89. Thus, the liquor requires no added alkalinity for safe treatment in a nickel-based alloy wet oxidation system.

We claim:

1. A process for treatment of a caustic sulfide liquor by wet oxidation in a nickel-based alloy system comprising the steps:
   a) analyzing the caustic sulfide liquor for initial concentrations of total alkalinity, total sulfides, mercaptans, COD, thiosulfate, total carbonate and pH to determine the amount of nonsulfidic alkalinity consumed by said liquor upon wet oxidation treatment;
   b) adding sufficient additional nonsulfidic alkalinity to said caustic sulfide liquor whereby the initial nonsulfidic alkalinity concentration plus additional nonsulfidic alkalinity concentration exceeds the nonsulfidic alkalinity consumed upon wet oxidation treatment as determined in step a; and
   c) carrying out said treatment process of wet oxidation upon said caustic sulfide liquor within said nickel-based alloy system to destroy sulfides and mercaptans and produce a treated liquor with excess nonsulfidic alkalinity concentration thereby preventing excessive corrosion to said nickel-based alloy wet oxidation system.

2. A process according to claim 1 wherein said caustic sulfide liquor is produced from a scrubbing process.

3. A process according to claim 1 wherein said caustic sulfide liquor is produced from an extraction process.

4. A process according to claim 1 wherein said additional nonsulfidic alkalinity is added to said liquor in the form of alkali metal hydroxide.

5. A process according to claim 1 wherein said additional nonsulfidic alkalinity is added to said liquor in the form of alkali metal carbonate or bicarbonate.

6. A process according to claim 1 wherein the pH range for said treated liquor is between 8 and 14.

* * * * *

UNITED STATES PATENT AND TRADEMARK OFFICE
CERTIFICATE OF CORRECTION

PATENT NO. : 5,082,571
DATED : January 21, 1992
INVENTOR(S) : David A. Beula et al.

It is certified that error appears in the above—identified patent and that said Letters Patent is hereby corrected as shown below:

Col. 6, line 4, "$\{+\}$" should read --$\{H^+\}$--.

Signed and Sealed this

Thirtieth Day of March, 1993

Attest:

STEPHEN G. KUNIN

Attesting Officer

Acting Commissioner of Patents and Trademarks